United States Statutory Invention Registration [19]

[11] Reg. Number: H825

Green et al. [43] Published: Oct. 2, 1990

[54] PROCESS FOR CONDITIONING A HIGH CARBON DIOXIDE CONTENT NATURAL GAS STREAM FOR GAS SWEETENING

[75] Inventors: Joe R. Green, Houston; Freeman L. Morgan Jr., Chandler, both of Tex.

[73] Assignee: Exxon Production Research Company, Houston, Tex.

[21] Appl. No.: 196,747

[22] Filed: May 20, 1988

[51] Int. Cl.[5] ..... F25J 3/00

[52] U.S. Cl. ..... 62/20; 62/24; 62/27

[58] Field of Search ..... 62/20

[56] References Cited

U.S. PATENT DOCUMENTS

| | | | |
|---|---|---|---|
| 2,551,399 | 5/1951 | Silverberg | 62/175.5 |
| 2,888,807 | 6/1959 | Bocquet | 62/11 |
| 3,398,544 | 8/1968 | Crownover | 62/12 |
| 4,270,937 | 6/1981 | Alder et al. | 61/17 |
| 4,459,142 | 7/1984 | Goddin | 62/17 |
| 4,460,395 | 7/1984 | Nobles et al. | 62/18 |
| 4,533,373 | 8/1985 | Butz et al. | 62/17 |
| 4,563,202 | 1/1986 | Yao et al. | 62/20 |
| 4,591,370 | 5/1986 | Gazzi et al. | 62/20 |
| 4,681,612 | 7/1987 | O'Brien et al. | 62/23 |

OTHER PUBLICATIONS

Hise et al.; "A Low-Temperature Energy-Efficient Acid Gas Removal Process"; American Chemical Society, Industrial Gas Separations; 12/23/82; pp. 27–45.

Denton et al.; "Two Combined Cryogenic Processes Cut Sour Natural-Gas Processing Cost"; Oil & Gas Journal; 8/19/85; pp. 120–124.

Riesenfeld et al.; "Gas Purification"; Gulf Publishing Company; Second Edition, 1974; Chapter 2.

Jarret, F. W., "Fundamentals of Acid Gas Fractionation", *Hydrocarbon Processing*, Apr. 1983, p. 67–70.

Schianni, G. C., "Cryogenic Removal of Carbon Dioxide from Natural Gas", Inst. Chem. Eng. Symp. Ser., vol. 44, 1976, pp. 1-50 to 1-55.

*Primary Examiner*—John F. Terapane
*Assistant Examiner*—Valerie D. Fee

[57] ABSTRACT

A process for pretreating a natural gas stream having greater than about 40 mole % $CO_2$ to reduce the amount of $CO_2$ in the gas stream prior to treatment in a conventional sweetening process comprising passing the gas stream through a separator zone which condenses the $C_6$ plus hydrocarbons and then passing the gas stream from the separator into a stripping zone which further reduces the temperature of the gas stream to remove a substantial quantity of $CO_2$ as a liquid condensate.

16 Claims, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PROCESS FOR CONDITIONING A HIGH CARBON DIOXIDE CONTENT NATURAL GAS STREAM FOR GAS SWEETENING

FIELD OF THE INVENTION

The present invention relates to a process for treating a high carbon dioxide content gas stream, i.e., carbon dioxide content greater than about 40 mole percent. More particularly, the invention relates to a method for treating such a high carbon dioxide content gas stream which first removes therefrom the condensible $C_6$ plus hydrocarbon content separate from carbon dioxide, following which a bulk quantity of carbon dioxide is separated from the gas stream as a high pressure, moderately cold, liquid phase. The processed gas stream has its residual $CO_2$ content reduced to a level which renders the gas stream amenable to treatment by conventional gas sweetening methods for recovery of the gas in marketable form.

BACKGROUND OF THE INVENTION

Natural gas, however produced, may contain acid gas impurities, particularly carbon dioxide and hydrogen sulfide. Such natural gas is referred to as "sour gas," meaning that the "sweet" natural gas is contaminated with an unacceptable quantity of "sour" acid gas impurities. The presence in natural gas of such acid gas impurities is objectionable, among other reasons, because of the corrosion problems they cause during pipeline transmission of the natural gas to market and because acid gas contaminants reduce the BTU content per standard cubic foot of the natural gas product. Natural gas produced from a field having significant quantities of such acid gas components must be treated for removal of such impurities, or sweetened, before the natural gas therefrom can be marketed. Of necessity, the treatment to sweeten a natural gas produced from such a field adds to its cost of production. The character and content of the acid gas components in the natural gas of the field can approach levels where the added cost of treating the produced sour gas for removal of such impurities to produce a marketable sweet natural gas may make it uneconomical to exploit the gas field.

As noted, the processing of sour natural gas generally involves a gas sweetening process that splits the sour natural gas into two process streams: a sweet residue gas stream, and an acid gas stream. The sweet residue gas stream, typically made up of methane and light hydrocarbon ends, may go on to additional processing and hydrocarbon recovery or directly to gas sales. Impurities and sulphur compounds are removed from the acid gas stream leaving a carbon dioxide-rich acid gas stream. Often the carbon dioxide-rich product is needed at high pressure for carbon dioxide pipeline sales to enhanced oil recovery (EOR) projects or for reinjection into disposal wells. Alternatively, a high pressure carbon dioxide gas stream may be flashed to a low pressure and cold temperature, i.e., 90 psia, −60° F., and used to provide process refrigeration.

In general, two basic approaches have been developed for use in processing natural gas containing significant quantities of carbon dioxide for the removal of that acid gas impurity. One approach employs physical solvents for the absorption and separation of the carbon dioxide impurity from the natural gas. In the solvent approach, the carbon dioxide containing natural gas is contacted countercurrently with a solvent in an absorption tower wherein the solvent physically absorbs carbon dioxide from the natural gas. Sweetened natural gas is recovered as an overhead gas stream from the absorption tower. The carbon dioxide-rich solvent is circulated to a regenerator vessel where the solvent is usually regenerated by pressure reduction, that is, when pressure on the carbon dioxide-rich solvent is reduced, carbon dioxide flashes out of the solvent as a gas. Hence, the solvent method produces a low pressure, vapor phase, carbon dioxide stream, and the regenerated lean solvent is recirculated to the absorption tower. At typical processing pressures, the required lean solvent circulation rate increases with increasing carbon dioxide content of the natural gas stream under treatment. As a result, higher solvent circulation rates are required to remove carbon dioxide from feed gases as the carbon dioxide concentration of the feed gas increases.

A second basic approach for removing carbon dioxide from a natural gas stream is cryogenic fractionation. In such process, methane and lighter components are separated from carbon dioxide and heavier components in a multi-stage tower or fractionator. Typically, the fractionator has both a stripping section and a rectifying section. In the stripping section, heat is supplied to the bottom of the tower to vaporize light hydrocarbon ends remaining in the liquified carbon dioxide bottoms, while in the rectifying section, condensed light hydrocarbons ends are recirculated to the top of the tower as a reflux to cool and condense carbon dioxide vapor remaining in the methane-rich vapor top ends. For such separation to be achieved, the fractionator must operate at cryogenic temperature, i.e., temperatures in the range of −60° to −130° F. As a result, high compressor horsepower is required to provide the external process refrigeration or, if product stream carbon dioxide is expanded for use as a refrigerant for operation of the cryogenic fractionator, to recompress the carbon dioxide.

Although both methodologies, physical solvents and cryogenic fractionation, can be applied to a high carbon dioxide content natural gas stream, the cost of utilizing either type of process for the treatment of a high carbon dioxide content natural gas stream, i.e., carbon dioxide greater than 40 mole percent, can be prohibitively expensive. In some special circumstances, cryogenic fractionation may be employed for separation of the $CO_2$ content of a high carbon dioxide content methane gas stream to prepare a sales gas grade of methane. One such special circumstance is with regard to landfill gas as discussed in U.S. Pat. No. 4,681,612. From the standpoint of odors and safety, landfill gas must be removed from the landfill site in any event. Since the cost of producing landfill gas and the quantities of such gas to be processed are minuscule in comparison to that of production of natural gas from a natural gas field, employment of cryogenic fractionation to upgrade the methane content of such landfill gas to a marketable sales-gas quality may be justified on a cost basis.

However, the use of a physical solvent or a cryogenic fractionation process for the removal of carbon dioxide from a sour natural gas stream, by reason of the gas volumes involved, becomes exceedingly expensive when the carbon dioxide content is greater than about 40 mole %. The primary factors dictating the expense of treatment with regard to either process is due to the large equipment requirements caused by the high gas volumes to be processed. Further adding to the expense wherein cryogenic fractionation is utilized is the cost of special construction materials. Whereas normal carbon steel can be used at temperature of −20° F. or greater, for operations at lower temperatures carbon steel must be specially treated. For operation at cryogenic temperatures, −50° F. or less, special materials, such as nickel steels, are required. In a cryogenic fractionation process, the cost of providing external refrigeration and/or recompression costs for carbon dioxide if it is used as a refrigerant by expansion, becomes prohibitive. The special materials requirements taken together with the large equipment sizes required makes cryogenic fractionation economically unattractive. Likewise the physical solvent method is economically unattractive. For instance, in a physical solvent method that treats a natural gas stream containing 65 mole % carbon dioxide to produce 200 mscfd of market grade natural gas requires about 400 kbpd of solvent circulation to the absorber tower, and of course, the attendant cost of regeneration of such solvent. Further, the solvent method produces the carbon dioxide product stream as a gas stream. For the $CO_2$ to be used for EOR application or to be reinjected into disposal wells, it must be recompressed which adds extra cost.

As a consequence, the development of a method which significantly reduces the cost of sweetening a high $CO_2$ content natural gas would greatly add to the industry's motivation to develop and explore natural gas fields wherein the natural gas contains more than about 40 mole % carbon dioxide. Several such fields are known to exist having producible natural gas containing carbon dioxide concentrations of 65–70 mole % with some fields being as high as 80–90 mole % carbon dioxide.

For such high carbon dioxide content natural gas fields to be viable for exploitation, it is necessary to develop a more cost effective process for sweetening the natural gas from such fields to a marketable quality. It would be particularly desirable that such process be one which removes carbon dioxide as a high pressure moderately cold liquified product stream.

SUMMARY OF THE INVENTION

The new process provides for the bulk separation of carbon dioxide from a high carbon dioxide natural gas stream prior to final removal of residual carbon dioxide from such natural gas stream by a conventional gas sweetening process. The new process readily reduces the carbon dioxide content by a magnitude which conditions the natural gas stream for economical treatment by physical solvent or cryogenic fractionation sweetening processes. Furthermore, the carbon dioxide removed from the natural gas stream by the process of this invention is removed as a liquid carbon dioxide stream at relatively high pressure and moderately cold temperature. The utilization of the process of this invention upstream of a final carbon dioxide removal process significantly reduces downstream processing costs and requirements for a final gas sweetening process.

The pretreatment process of this invention comprises a two stage process that removes a substantial quantity of the carbon dioxide content of the sour natural gas feed by liquifying and separating the carbon dioxide at a relatively high pressure and moderately cold temperature, i.e. at temperatures warmer than that required for $CO_2$ separation by cryogenic fractionation. The first step of the process is a separation stage wherein condensation of $C_6$ plus hydrocarbons and some carbon dioxide to liquids is accomplished. The second step of the process comprises a stage of high pressure stripping of the overhead gas stream from the separation stage which provides high liquid recovery of carbon dioxide while allowing methane condensed within the liquid $CO_2$ stream to be revaporized. The resultant gas stream after high pressure stripping has a gas volume 20% to 60% less than that of the inlet sour natural gas stream feed to the separation stage.

The two stage pretreatment process of this invention is applicable to natural gas stream containing $CO_2$ concentrations of about or greater than 40 mole %. Utilizing the two stage pretreatment process of this invention upstream of a final carbon dioxide removal process results in considerable cost savings due to reductions in both the total gas volume and the amount of carbon dioxide to be treated for final gas sweetening in a downstream gas sweetening process such as a physical solvent or a cryogenic fractionation process. Cost savings are realized primarily through significant reductions in downstream equipment size, requirements for special construction materials and compression horsepower requirements in a final gas sweetening process.

DETAILED DESCRIPTION OF THE PREFERRED EMBODIMENTS

The process of the invention is intended to remove a sufficient quantity of the $CO_2$ content from a high $CO_2$ content natural gas stream as to render the pretreated gas stream amenable to gas sweetening by conventional gas sweetening processes at significantly reduced cost.

Figure 1:
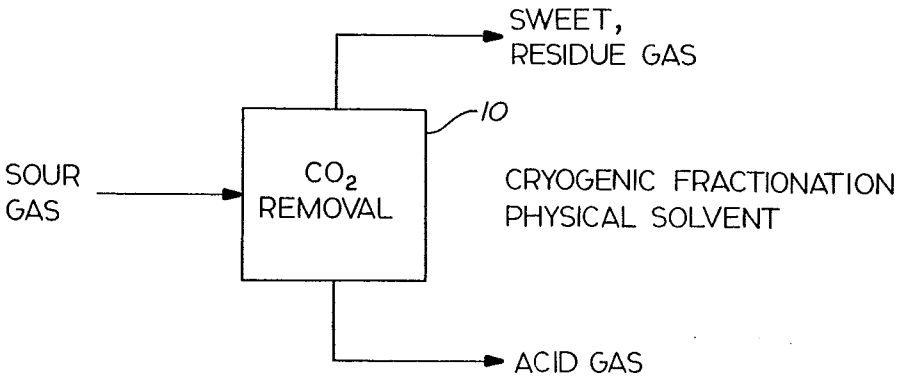
FIG. 1 is a schematic representation of a sour natural gas sweetening process, wherein the process is of conventional prior art technique such as cryogenic fractionation or physical solvent.

In this regard, FIG. 1 schematically illustrates a conventional gas sweetening process 10, which may be a physical solvent process as generally described in Fred C. Riesenfeld and Arthur L. Kohl, "Gas Purification," Gulf Publishing Company, second edition, 1974, Chapter 2 or a cryogenic fractionation process as described in "Two Combined Cryogenic Processes Cut Sour Natural-Gas Processing Cost," Robert D. Denton and David D. Rule, *Oil and Gas Journal,* Aug. 19, 1985.

For a natural gas to be amenable to treatment by such conventional gas sweetening processes, it should contain no more than 40 mole % $CO_2$. Such natural gas stream may be one which contains more than 40 mole % $CO_2$ by reason of the conditions of the gas field itself or by reason that $CO_2$ has been injected into the field as a drive fluid and is recovered with natural gas produced during an enhanced oil recovery (EOR) operation. Hence, conventional sweetening processes, as illustrated in FIG. 1, become exceedingly expensive or cost prohibitive for application to natural gas streams having greater than 40 mole % $CO_2$. The conditions of temperature and pressure of the process of this invention enable the use of standard construction materials, i.e. normal carbon steel, for practice of the process. Consequently at the temperature ranges within which the process operates a natural gas stream having a $CO_2$ content less than 40 mole % is not suited to treatment by the process of the invention since its gas volume will not be significantly reduced by such treatment. Further, a gas stream having less than 10 mole % hydrocarbon content would have so little marketable quantity of hydrocarbon product that its treatment by a process of the invention would not be warranted from the standpoint of improving the economy of treating such gas by a final sweetening process for recovery of the natural gas component in marketable form. Consequently, natural gas streams which are the most suitable candidates for treatment by the process of the invention are those containing from about 40 to about 90 mole % carbon dioxide. Pretreatment of such high $CO_2$ content natural gas streams by the process of the invention significantly reduces the cost at which the resulting gas stream may be treated by a final sweetening process of conventional design.

Figure 2:
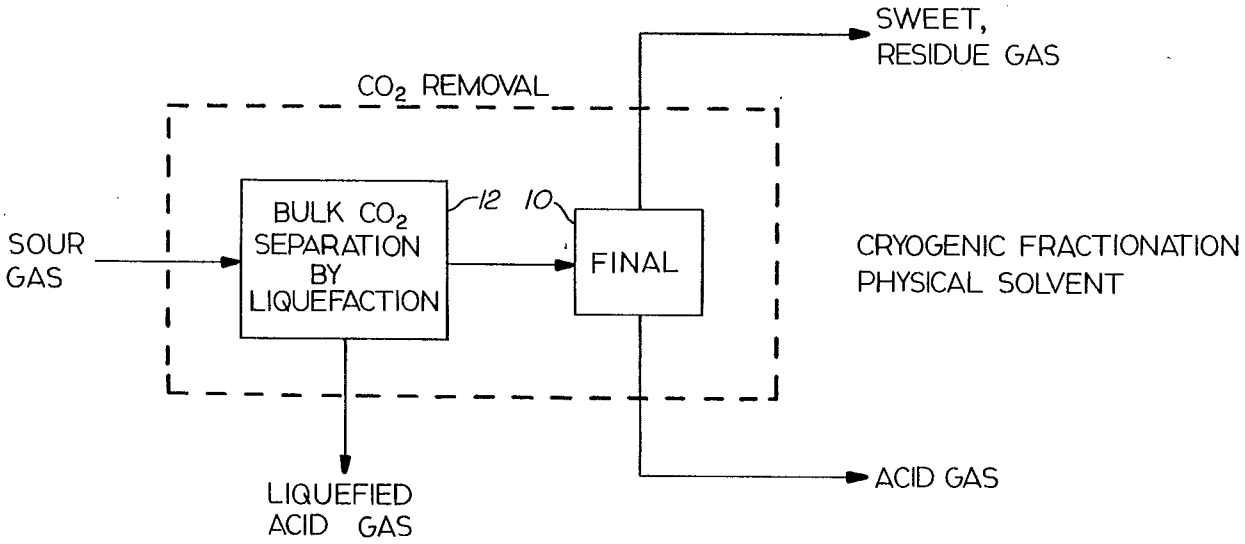
FIG. 2 is a schematic representation of the interface between the process of the invention, by which bulk $CO_2$ separation is performed on the sour natural gas stream to precondition it for a final gas sweetening treatment, and a conventional gas sweetening process.

The process of the invention may be employed to precondition a high $CO_2$ content natural gas stream for economical final gas sweetening by a conventional gas sweetening process. FIG. 2 illustrates the interface of the process of the invention 12 with a conventional gas sweetening process final stage 10.

Figure 3A:
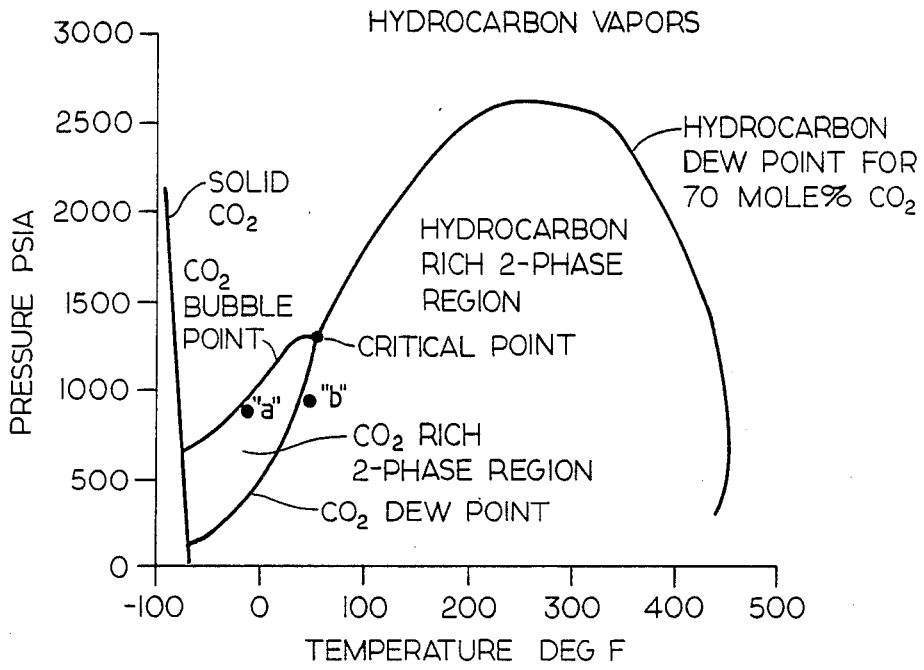
FIGS. 3A and 3B are phase diagrams illustrating the temperature-pressure, liquid-solid-vapor boundary conditions for several high $CO_2$ content natural gas streams amenable to pretreatment by the process of the invention; the phase diagram of FIG. 3A, represented by solid line, is for a gas stream of the composition 70 mole % $CO_2$, 27 mole % $CH_2$, 2.5 mole % ethane and heavier hydrocarbon, and 0.5 mole % $H_2S$; the phase diagram of FIG. 3B, represented by a broken line, is illustrative of a natural gas stream containing 40 mole % $CO_2$, the phase diagram of FIG. 3B, represented by a dash-dot line, is illustrative of a natural gas stream containing 90 mole % $CO_2$.
Figure 4:
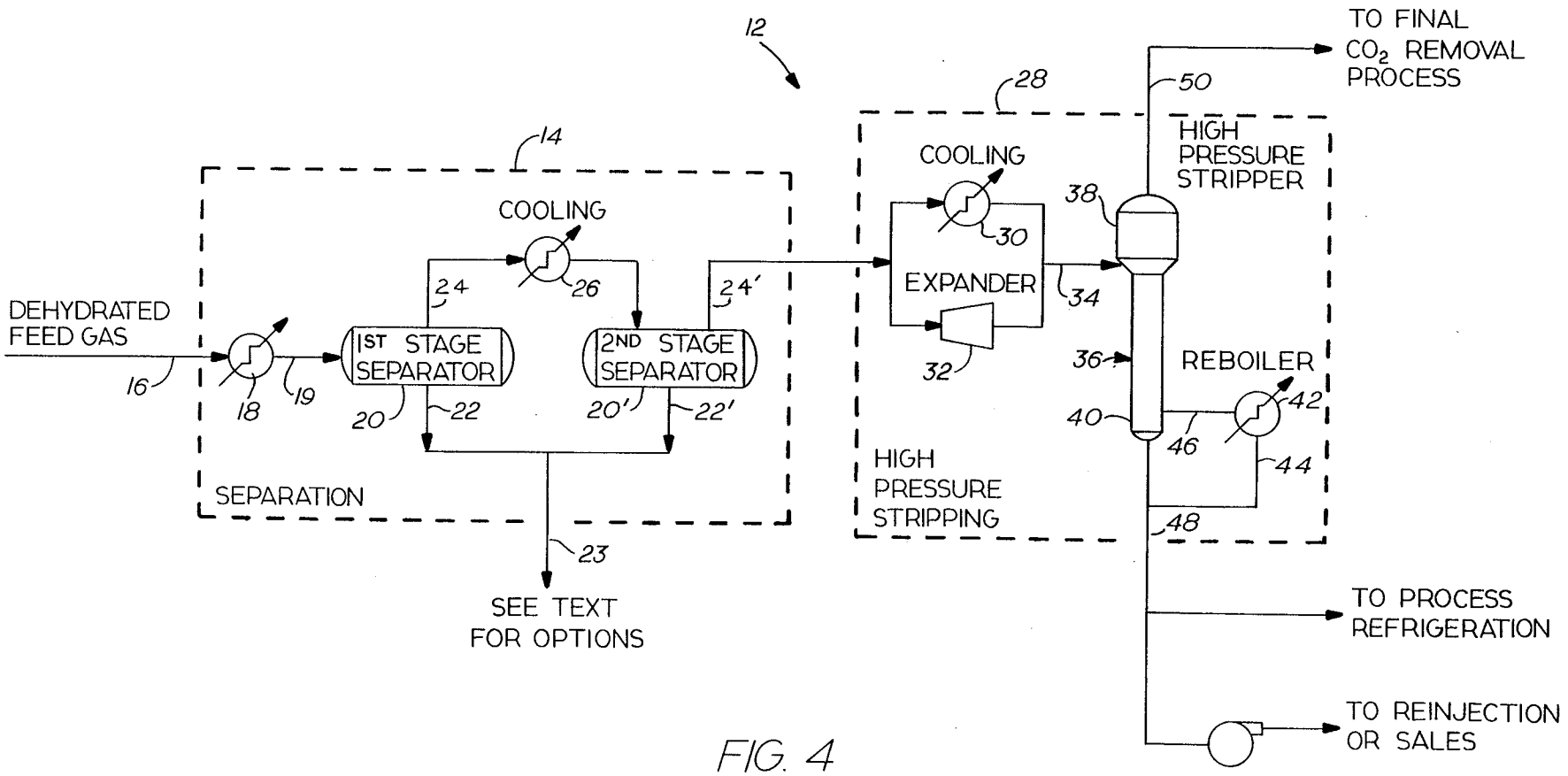
FIG. 4 illustrates in flow schematic form one embodiment of a pretreatment process in accordance with the invention.

FIG. 4 illustrates an embodiment of the pretreatment process of the invention. The process consists of two basic stages: namely, a separation stage 14 and a high pressure stripping stage 28. Typical operating points for the two stages of the process are illustrated on the phase diagrams of FIG. 3A for an actual 70 mole % $CO_2$ content natural gas stream as point "a" for the high pressure stripping stage and point "b" for the separation stage.

For convenience the first stage 14 of the pretreatment process is referred to as "separation." In the first or separation stage of the process, dehydrated sour natural gas 16 is first cooled by heat exchange in heat exchanger 18 and passed by inlet line 19 to a separator vessel 20 designed for vapor-liquid separation. Condensed liquids, primarily condensate ($C_6$ plus hydrocarbons) and some $CO_2$, are separated and removed in separator 20. The condensate liquid is removed from separator 20 by outlet line 22. The overhead vapor or remaining gas stream is passed by overhead line 24 to further processing, as in high pressure stripping stage 28, or to yet another separator vessel 20′ if desired.

One or two cooling/separation vessels 20 and 20′ may be used depending on the exact nature of the produced fluid. Wherein, by reason of the inlet gas stream composition, it is preferred to employ a second stage of separation as per a second separator 20′ as illustrated, the overhead gas passing by overhead line 24 from the first separator 20 is preferably passed through a heat exchanger 26 for additional cooling. Generally, cooling in the heat exchangers 18 and 26 may be provided by cooling water or process heat exchange. External refrigeration is not required. The separators 20 and 20′ are two phase pressure vessels and should have adequate area to separate the gas and liquid phases.

Figure 3B:
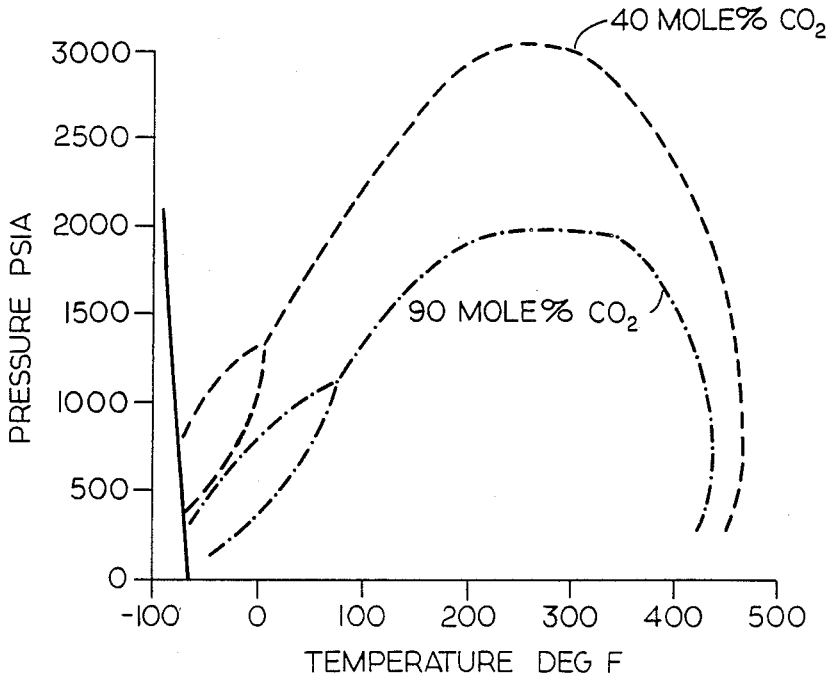

The operating conditions must be such that the separators 20 and 20′ operate in the two phase region shown in FIG. 3A or 3B where the majority of the heavy hydrocarbons condense without the light hydrocarbon ends. Hence, the appropriate pressure and temperature should be selected to maximize recovery of liquid hydrocarbons. (See operating point "b" in FIG. 3A for a 70 mole % $CO_2$ natural gas stream.) Typical operating conditions range from 600 to 1200 psia and 30° to 80° F.

As illustrated in FIG. 4, more than one separation stage may be provided, if desired. If more than one separation stage is provided, the separator vessels should operate at successively lower pressures and temperatures to improve separation efficiency and enhance the overall recovery of the hydrocarbon liquids. Additional separation stages will minimize downstream processing requirements for hydrocarbon recovery.

The liquids passed by line 23 from the separation stage may be fed to a stabilizer for hydrocarbon recovery, used as fuel for gas-fired equipment, used for process cooling, fed to the high pressure stripper for methane recovery, or pumped for reinjection.

For convenience, the second stage 28 of the pretreatment process is referred to as "high pressure stripping." Here, a bulk quantity of the $CO_2$ content of the sour natural gas stream issuing from the separation stage is condensed and separated from the natural gas stream with only a small amount of methane and other light hydrocarbon ends. Vapor leaving the separator stage by line 24, or alternatively 24′, is the feed gas stream to the high pressure stripping stage 28. The feed gas stream is first chilled by either refrigeration in a heat exchanger 30 or expansion through a power recovery turbine 32 and then fed by line 34 to the high pressure stripper 36. Refrigeration may be provided by process heat exchange or an external refrigeration system.

The high pressure stripper 36 may be either a packed or trayed stripping column. The chilled gas stream from line 34 enters the top 38 of the stripping column 36. Operation at the top of the stripping column is reflected by point "a" of FIG. 3A for a 70 mole % $CO_2$ natural gas stream. Heat is supplied to the bottom 40 of the column by circulation of a portion of the $CO_2$-rich liquid stream from outlet line 48 through line 44 to a reboiler 42 by an external source such as hot oil or process heat exchange. The heated $CO_2$-rich stream is returned from reboiler 42 by line 46 to the bottom 40 of column 36 to revaporize light hydrocarbon ends remaining in the $CO_2$-rich liquid accumulated in the bottom of the column. The reboiler temperature is set so that only a small amount of the methane is left in the $CO_2$-rich liquid. The reboiler temperature should be set to maintain a temperature in the liquid phase accumulated in the bottom of the column near the bubble point of pure $CO_2$. The reboiler on the high pressure stripper 36 thereby allows the condensed methane to be revaporized while maintaining high liquid recovery of the $CO_2$.

The $CO_2$-rich, stripper bottoms are removed by outlet line 48 and may be pumped for reinjection or $CO_2$ sales, or used for process cooling during revaporization. The methane-rich vapors exiting the top of the column through line 50 are sent to a final $CO_2$ removal process, such as solvent treating, cryogenic fractionation, or other cryogenic processes, such as those disclosed in U.S. Pat. No. 4,533,372. The $CO_2$ content of the methane-rich gas leaving the stripper through line 50 ranges from about 30 to 50 mole percent, depending on the process operating conditions. Because the vapor exiting the top of the column is processed further, a rectifying section is not needed in the stripper column itself.

The operating conditions of the high pressure stripper are set to provide bulk removal of the $CO_2$ while minimizing methane losses. The operating pressure must be below the critical pressure of the mixture and should be optimized based on both the upstream and downstream process conditions. Generally, the pressure is maintained at as high a level as possible in order to minimize the cost of further handling of the $CO_2$-rich liquid and the methane-rich vapor.

The operating temperatures of the stripper 36 have the greatest impact on the process. The gas stream feed in line 34 to the stripper should be chilled to temperatures in the range of about 0° to −20° F. Temperatures in this range maximize the amount of $CO_2$ condensed, minimize refrigeration requirements and allow normal carbon steel materials to be used in the equipment design. The reboiler temperature and the number of separation stages of column 36 determine the amount of methane that is lost to the $CO_2$-rich liquid. Typically, reboiler temperatures are on the order of 30° to 80° F. with about 6 to 15 theoretical separation stages.

The operating ranges discussed above are with reference to a 70 mole % $CO_2$ gas stream as illustrated by FIG. 3A and are for illustration; actual process operating conditions should be selected and optimized for each specific application, which may be readily determined based upon the precise composition of the gas stream to be treated.

As may be seen from FIGS. 3A and 3B and the phase envelope lines thereon for a 40, 70 and 90 mole % $CO_2$ content natural gas stream, the selection of the precise operating conditions for the separation and stripper stages depends upon the composition of the gas stream to be treated. The operating window for temperatures and pressures is narrow when treating a 40 mole % $CO_2$ content gas stream, but progressively broadens as $CO_2$ content increases up to the 90 mole % level (FIG. 3B). Generally, for a 40 mole % $CO_2$ content gas stream the separator stage must be set for operation at about 0° F. and a pressure of from about 1100 to about 1200 psia while the stripper stage is operated with a gas inlet temperature of about −20° F. and a pressure of about 1100 to 1200 psia. For a 90 mole % $CO_2$ content gas stream the separator stage may be set for operation at an inlet gas temperature of up to about 60° F. at a pressure of about 950 psia and the stripper operated at an inlet gas temperature from about 0° F. to about −20° F. at gas pressures respectively from about 800 psia to about 675 psia.

Figure 5:
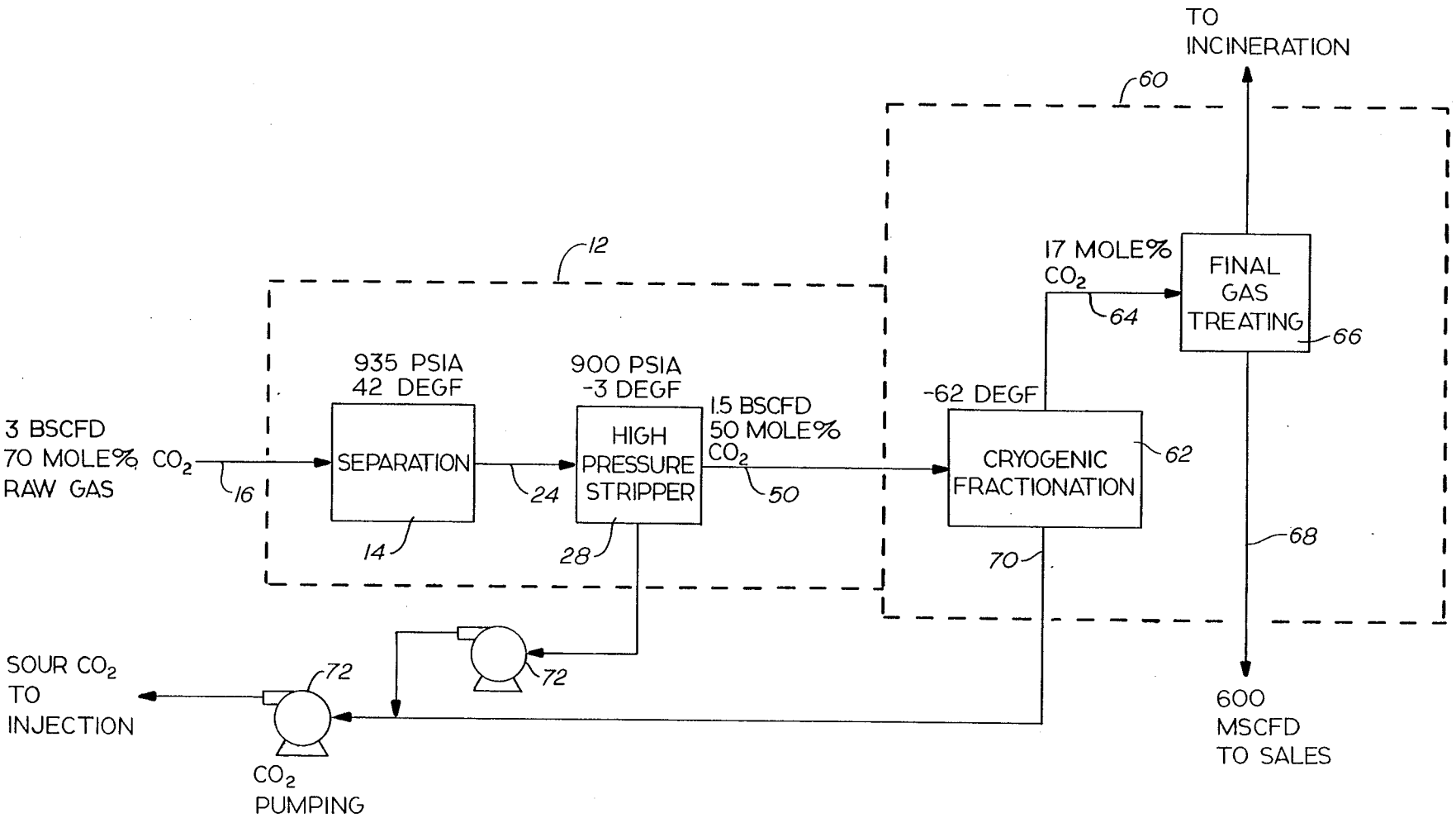
FIG. 5 illustrates in schematic form the processing of the 70 mole % $CO_2$ content natural gas stream of a composition as described in FIG. 3A by the pretreatment process of the invention, followed by final sweetening with a conventional cryogenic fractionation process.

FIG. 5 illustrates the process of the invention 12 as integrated with a cryogenic fractionation process 60 of conventional design as a final gas sweetening stage, as applied to a sour natural gas stream 16 of the 70 mole % $CO_2$ content composition as illustrated by the phase diagram of FIG. 3A. For such a sour natural gas stream, for the gas volumes and conditions of temperature and pressure illustrated in FIG. 5, the compositions, gas volumes, process horsepower and equipment size requirements are described. The dehydrated feed gas is cooled to 40° F. and condensed hydrocarbon liquids and a small amount of $CO_2$ are separated. The gas is then chilled to −3° F. and enters the high pressure stripper operating at 900 psia. The $CO_2$ content of the vapors leaving the stripper is reduced from 70 mole % to 50 mole %, resulting in a 50% reduction in total gas volume to be finally treated in a conventional cryogenic gas sweetening process 60. In the cryogenic fractionation stage 62, the $CO_2$ content is reduced to 17 mole % and the methane-rich gas is sent by line 64 to final treating 66 to produce the final sales gas 68. The $CO_2$-rich liquid streams 25 from the stripper 28 and the cryogenic fractionation stage 62 are pumped by pumps 72 to high pressure for reinjection. Low temperature process refrigeration is supplied by an external refrigerant. The total horsepower requirement is estimated to be about 275 kBHP. The high pressure strippers (18 ft. ID×65 ft. H) are required to process the full raw gas rate. The gas volume leaving the stripper, about 1.5 Bscfd, may be treated by three cryogenic fractionators (10 ft. ID×73 ft. H).

Figure 6:
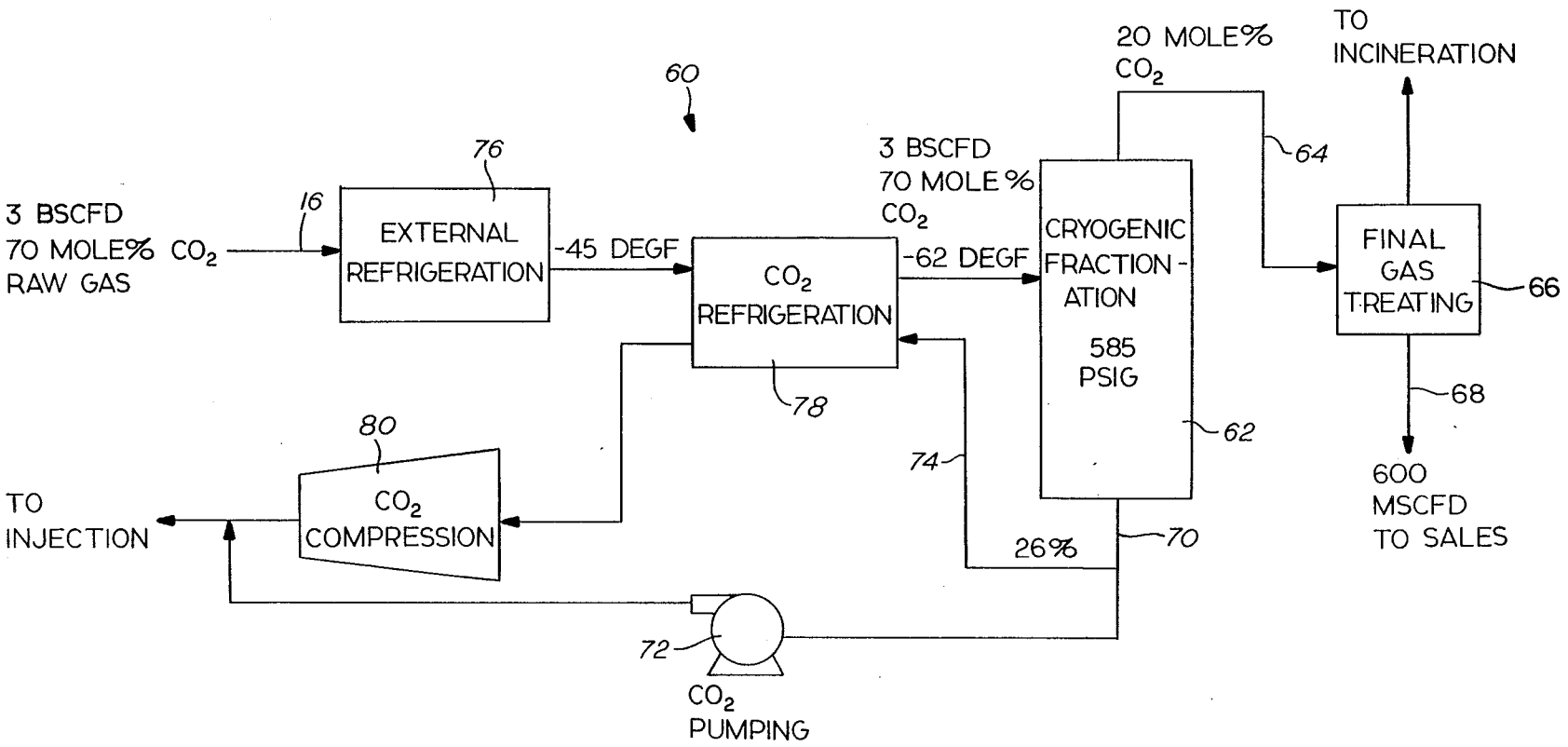
FIG. 6 illustrates in schematic form the processing of the 70 mole % $CO_2$ content natural gas stream of a composition as described in FIG. 3A by a conventional cryogenic fractionator without pretreatment by a process of the invention.

FIG. 6 illustrates the use of cryogenic fractionation process 60 for treatment of a 70 mole % $CO_2$ content gas stream of the composition as illustrated by the phase diagram of FIG. 3A without pretreatment by the process of the invention. For the gas volumes and conditions of temperature and pressure required for cryogenic separation of $CO_2$ as illustrated in FIG. 6, the compositions, gas volumes, process horsepower and equipment size requirements are described. The dehydrated feed gas is chilled by external refrigeration 76 and $CO_2$ refrigeration 78° to −62° F. and fed to a fractionation stage 62 operating at 600 psia. The overhead methane-rich vapors 64 contain about 20 mole % $CO_2$ and are sent to final processing 66 and from there by line 68 to gas sales. The bulk of the $CO_2$-rich liquid passed by line 70 from the fractionation stage 62 is pumped by pump 72 to high pressure for reinjection into the reservoir. Approximately twenty-six percent of the $CO_2$-rich liquid is passed by line 74 to refrigeration unit 78 to provide low-temperature process refrigeration prior to compression 80 to reinjection pressure. The total process horsepower requirement is estimated to be 455 kBHP. Three cryogenic fractionators (not shown in the drawings) of fractionation stage 62 (19 ft. ID×105 ft. H) process the full raw gas rate of about 3 Bscfd.

By pretreating the dehydrated raw gas with the pretreatment process of the invention, as illustrated in FIG. 5, before subjecting the gas stream to cryogenic fractionation, the total process horsepower required for final cryogenic fractionation is reduced by 40% for a total of about 275 kBHP. Without pretreatment by the process of the invention three cryogenic fractionators (19 ft. ID×105 ft. H) are required to handle the full raw gas rate of 3 Bscfd in a cryogenic fractionation process; however, by pretreating the gas with the process of the invention as illustrated in FIG. 5, after treatment in three high pressure strippers (18 ft. ID×65 ft. H), the three cryogenic fractionators (10 ft. ID×73 ft. H) are required to handle only 50% of the raw gas rate, or about 1.5 Bscfd.

The impact of the bulk $CO_2$ separation by pretreatment of the gas stream by the process of this invention to precondition a 70 mole % $CO_2$ content natural gas stream of the composition as illustrated by FIG. 3A for final gas sweetening with a physical solvent instead of the cryogenic fractionator has been reviewed. Preliminary calculations indicate a potential reduction in the solvent circulation rate by a factor of four when the pretreatment process of this invention is installed upstream of the solvent process.

Pretreatment of a high $CO_2$ content natural gas stream by the process of this invention accomplishes a reduction of both the total gas volume and the amount of $CO_2$ to be handled by the final $CO_2$ removal process. The process of this invention removes carbon dioxide in the liquid phase at a relatively high pressure and moderately cold (non-cryogenic) temperature.

Utilization of the process of this invention to pretreat a high $CO_2$ content natural gas prior to its final treatment in a gas sweetening process of conventional design permits significant cost saving to be realized in operation of the final gas sweetening process as follows: significant downsizing of equipment regardless of the final removal process selected can be accomplished since the total feed gas volumes can easily be reduced by 20 to 60 percent by the pretreatment process; substantial reduction in refrigeration and associated horsepower requirements for cryogenic fractionation processes; reduction of circulation rates for solvent processes; substantial reduction in downstream compression or pumping horsepower requirements when the $CO_2$ is to be sold or reinjected; separation of $CO_2$ as a liquid stream in the pretreatment process permits its use to provide low temperature, process refrigeration by revaporizing the liquid $CO_2$ thereby reducing process utility requirement; reduction in dehydration requirements for cryogenic processes by using the solvent ability of carbon dioxide for final water removal prior to processing at cryogenic temperatures; and flexibility to allow the bulk separation/final removal process to be optimized.

The invention has been described with reference to its preferred embodiments. Those of ordinary skill in the art, upon review of this disclosure, may appreciate variations which may be made which do not depart from the scope and spirit of the invention as described above or claimed hereafter.

I claim:

1. A process for pretreating a natural gas stream having greater than about 40 mole % carbon dioxide to remove therefrom a substantial quantity of the carbon dioxide as a high pressure liquefied product stream, comprising the steps of:

passing said gas stream through a separator zone at a temperature of from about 30° to about 80° F. while said gas stream is maintained at a pressure of from about 600 psia to about 1200 psia to remove from said gas stream as a liquid condensate those gas components which are condensible at said temperature and pressure;

removing the liquid condensate from the separator zone;

feeding the gas stream from the separator zone through a stripping zone at a temperature of from about −20° to about 0° F. while maintaining said gas stream at a pressure of from about 600 psia to about 1200 psia to remove from said gas stream a substantial quantity of the carbon dioxide content as liquefied carbon dioxide.

2. The process of claim 1, wherein the liquefied carbon dioxide removed has a temperature from about 30° to about 80° F. and a pressure of from about 600 psia to about 1200 psia.

3. The process of claim 1, wherein the volume of the gas stream exiting the stripping zone is 20 to 60% less than the volume of the natural gas stream passing into the separator zone.

4. The process of claim 1, wherein the carbon dioxide content of the gas stream exiting the stripping zone ranges from about 30 to about 50 mole percent.

5. The process of claim 1, wherein the natural gas stream has less than about 90 mole % carbon dioxide.

6. The process of claim 1, wherein the separator zone comprises more than one separation vessel.

7. The process of claim 1, wherein the stripping zone comprises a packed or trayed stripper column.

8. The process of claim 1, further comprising processing said gas stream from said stripping zone in a cryogenic sweetening process wherein the carbon dioxide content of said gas stream is further reduced.

9. The process of claim 1, further comprising processing said gas stream from said stripping zone wherein additional carbon dioxide in said gas stream is absorbed by a solvent.

10. A process for pretreating a natural gas stream having from about 40 to about 90 mole % carbon dioxide to remove therefrom a substantial quantity of the carbon dioxide as a high pressure liquefied product stream, comprising the steps of:

passing said gas stream through a separator zone at a temperature of from about 30° to about 80° F. while said gas stream is maintained at a pressure of from about 600 psia to about 1200 psia to remove from said gas stream as a liquid condensate those gas components which are condensible at said temperature and pressure;

removing the liquid condensate from the separator zone;

feeding the gas stream from the separator zone through a stripping zone at a temperature of from about −20° to about 0° F. while maintaining said gas stream at a pressure of from about 600 psia to about 1200 psia to remove from said gas stream a substantial quantity of the carbon dioxide content as liquefied carbon dioxide, thereby reducing the carbon dioxide content of the gas stream exiting the stripping zone to a range from about 30 to about 50 mole percent.

11. The process of claim 10, wherein the liquefied carbon dioxide removed has a temperature from about 30° to about 80° F. and a pressure of from about 600 psia to about 1200 psia.

12. The process of claim 10, wherein the volume of the gas stream exiting the stripping zone is 20 to 60% less than the volume of the natural gas stream passing into the separator zone.

13. The process of claim 10, wherein the separator zone comprises more than one separation vessel.

14. The process of claim 10, wherein the stripping zone comprises a packed or trayed stripper column.

15. The process of claim 10, further comprising processing said gas stream from said stripping zone in a cryogenic sweetening process wherein the carbon dioxide content of said gas stream is further reduced.

16. The process of claim 10, further comprising processing said gas stream from said stripping zone wherein additional carbon dioxide in said gas stream is absorbed by a solvent.

* * * * *